April 2, 1946.  H. D. COLMAN  2,397,777

GEARING

Filed Nov. 2, 1942

Howard D. Colman, Inventor Deceased
Harry A. Severson, Executor
BY Parker, Carlson, Pitzner - Hubbard
ATTORNEYS Patented Apr. 2, 1946

2,397,777

UNITED STATES PATENT OFFICE 2,397,777

GEARING

Howard D. Colman, deceased, late of Rockford, Ill., by Harry A. Severson, executor, Rockford, Ill., assignor to Barber-Colman Company, Rockford, Ill., a corporation of Illinois Application November 2, 1942, Serial No. 464,188

8 Claims. (Cl. 74—409)

This invention relates to gearing, particularly of the spur type, and the general object is to provide a novel means for minimizing backlash in such gearing.

A more detailed object is to eliminate backlash between two spur gears by wedging one or more connecting gears yieldably into mesh with the respective gears in directions generally radially thereof.

Another object is to improve the wedging action through the use of gears with high pressure angles.

A further object is to provide a backlash reducing mechanism which at the same time effects a speed reduction.

The invention also resides in the novel manner of mounting the connecting gear means to effect the backlash reduction.

Other objects and advantages of the invention will become apparent from the following detailed description taken in connection with the accompanying drawing, in which.

Figure 1:
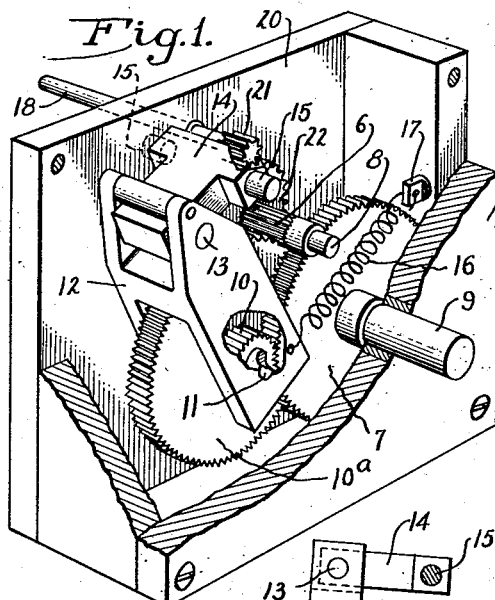
Figure 1 is a fragmentary perspective view of a gearing incorporating the novel features of the present invention.

While the invention is susceptible of various modifications and alternative constructions, what is shown in the drawing and herein described in detail is the preferred embodiment. It is to be understood, however, that it is not intended to limit the invention by such disclosure but aimed to cover all modifications and alternative constructions falling within the spirit and scope of the invention as expressed in the appended claims.

Generally stated, the gearing constituting the present invention comprises two spaced spur gears rotatably mounted to turn on parallel axes of fixed spacing and a rotary connecting gear or gears mounted for bodily movement in any direction in a plane perpendicular to the spaced axes and yieldably urged into the throat between the two gears so as to be wedged constantly in mesh with these gears in a direction generally radially of both spaced axes. Under the resilient force, the surfaces of the teeth on the floating gears are wedged into the teeth of the fixed gears and thus take up any backlash at the points of mesh.

Figure 3:
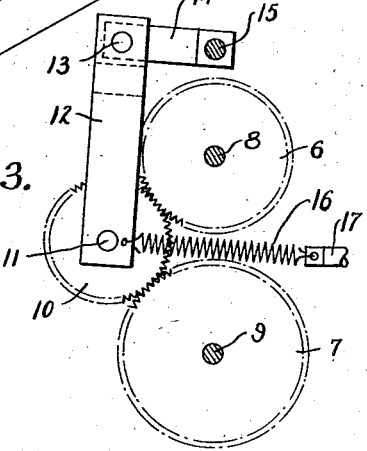
Fig. 3 is a similar view of another form of the gearing.

In one form of the gearing shown in Fig. 3, the two spur gears 6 and 7 are mounted on fixed shafts 8 and 9 with the gear peripheries disposed adjacent but spaced from each other. One gear 10 meshes with both gears 6 and 7 to form a driving connection therebetween. The gear 10 turns on a center 11 paralleling the shafts 8 and 9 and is of a diameter greater than the spacing of the gears 6 and 7 so that the gear is, in its meshing position, disposed in the throat between the two fixed gears and offset laterally from a line connecting the centers of the shafts 6 and 7.

To support the gear 10 for floating movement in accordance with the present invention, the shaft 11 is mounted on the free bifurcated end of a yoke 12, the other end of which is connected by a pivot 13 to the free end of an arm 14 fixedly pivoted at 15. The shaft 11 and the pivots 13 and 15 extend parallel to the shafts 8 and 9 so that the gear is movable bodily in any direction in the plane of the gears 6 and 7. The means for urging the gear 10 yieldably into mesh with the gears 6 and 7 may be a contractile spring 16 connected at one end to the member 12 and anchored at 17 so as to act along the line of action of the resultant of the radial forces on the intermeshing gears. This condition is usually satisfied when the line of action of the spring 16 approximately bisects the angle included between the centers 8, 11, and 9.

Because the gear 10 is free to float in two dimensions, the force of the spring 16 is resolved into radial pressures on the two fixed center gears with the result that the teeth of the connecting gear are wedged under equal pressures into mesh with the teeth of the fixed gears. By virtue of this action, any backlash between the gears 6 and 7 is eliminated.

Figure 4:
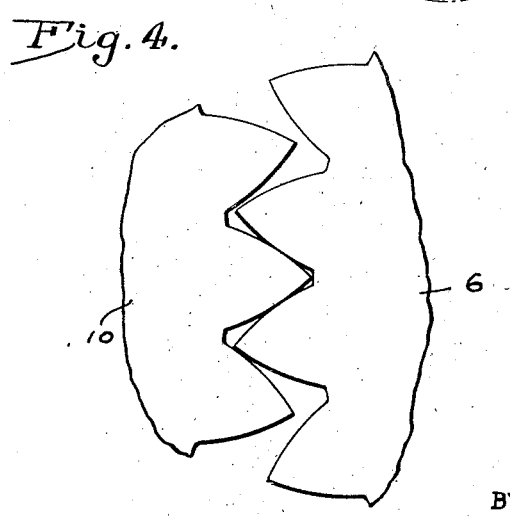
Fig. 4 is an enlarged fragmentary view of the intermeshing gear teeth.

To facilitate the action above described and prevent the gear teeth from becoming locked together, the teeth on the gears 6, 7 and 10 are formed with high pressure angles (see Fig. 4), that is, with pressure angles greater than 20 degrees and preferably on the order of 30 degrees.

Figure 2:
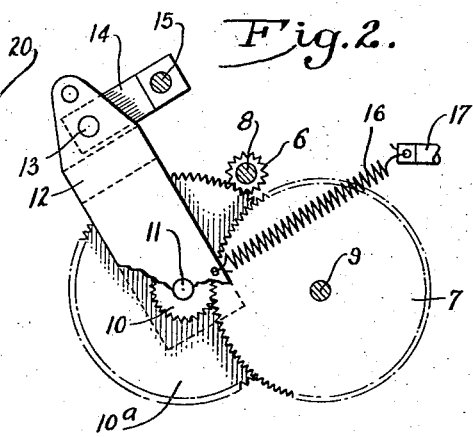
Fig. 2 is a side view of part of the gearing shown in Fig. 1.

Instead of employing the connecting gear means as an idler only, it may constitute a part of the reduction so that backlash at two points instead of one may be eliminated by floatingly mounting only one gear connection. As illustrated in Fig. 2, the gear 6 may take the form of a pinion while the gear 7 is of much larger diameter. Also, two connecting gears 10 and 10$^a$ of different sizes are mounted on the floating shaft 11 to turn together, the floating pinion 10 meshing with the gear 7 and the larger gear 10ᵃ meshing with the pinion 6, all gears having high pressure angles. As before, the spring 16 acts in a direction to wedge the connecting gears 10 and 10ᵃ into the teeth of the fixed gears 7 and 6 and thus take up backlash at the points of mesh between the gears 6 and 10ᵃ and also the point of mesh between the gears 7 and 10.

A complete gear train incorporating the backlash take-up mechanism is shown in Fig. 1 arranged to transmit power from an input shaft 18 to an output shaft 9. These are journaled in frame plates 20 which also support trunnions constituting the pivot 15. A pinion 21 on the input shaft meshes with a gear 22 on the shaft 8 which carries the pinion 6. The gear 7 is on the output shaft 9. Thus, the gear 6 to which one part of the spring force is applied is an intermediate instead of a high speed element of the train thereby avoiding the application of high radial pressures to the high speed element of the gearing and a corresponding reduction in efficiency.

The take-up mechanism is simple and inexpensive in construction and durable in operation. The yieldable force acting on the connecting gear means may, of course, be produced in numerous ways as, for example, by the resiliency of the mounting for the floating gear.

What is claimed is:

1. In a gear train, the combination of, two spur gears of different sizes spaced apart and mounted to turn on parallel axes of fixed spacing, a member mounted to swing about a fixed axis parallel to said axes, an element pivoted on said member to swing about a parallel axis, a pinion rotatably mounted on said element and meshing with said larger gear, a larger gear rotatable with said pinion and meshing with the smaller of said first gears, and means constantly urging said element in one direction toward said gears whereby to press both said pinion and said larger gear in radial directions toward the centers of said respective fixed gears.

2. In a gear train, the combination of, two spur gears of different sizes spaced apart and mounted to turn on parallel axes of fixed spacing, a pinion meshing with the larger of said gears, a second larger gear rotatable with said pinion and meshing with the smaller of said first gears, and means supporting said pinion and said second gear for floating movement toward and away from each of said axes, said floating pinion and second gear being urged into mesh with said first gears and applying to the latter forces directed generally radially thereof.

3. In a gear train, the combination of, two spur gears spaced apart and mounted to turn on parallel axes of fixed spacing, gear means adapted to mesh with said gears and provide a driving connection therebetween, means supporting said gear means for bodily floating movement transversely of said axes and toward or away from each of the latter, and means yieldably urging said gear means along a line intermediate said axes into mesh with said gears whereby said gear means applies radially directed forces to each of said gears.

4. In a gear train, the combination of, two spur gears spaced apart and mounted to turn on parallel axes of fixed spacing, a member mounted to swing about a fixed axis parallel to said axes, an element pivoted on said member to swing about a parallel axis, gear means rotatably mounted on said element and meshing with both of said gears to provide a driving connection therebetween, and means constantly urging said element in one direction toward said gears along a line intermediate said first mentioned axes.

5. In a gear train, the combination of, two spur gears spaced apart and mounted to turn on parallel axes, a spur gear connection yieldably urged into mesh with both of said first gears with the rotational axis of the connection offset from a line through said axes, and means supporting said connection for bodily transaxial planar movement relative to said first mentioned gears in any direction toward the latter to allow the gear teeth of the connection to come into full mesh and wedge with the teeth of the gears, the teeth of said gears and connection having pressure angles greater than twenty degrees.

6. In a gear train, the combination, of, two spur gears spaced apart and mounted to turn on parallel axes, gear means mounted for planar transaxial floating movement in all directions toward and away from said axes, and means yieldably urging said floating gear means toward said gears to wedge the same into mesh with the gears, the teeth of said gears and gear means having high pressure angles.

7. In a gear train, the combination of, two spur gears spaced apart and mounted to turn on fixed parallel axes, gear means meshing with each of said gears, and means supporting said gear means and yieldably urging the same transaxially toward both of said axes and in a plane perpendicular to the axes to allow the teeth of the gear means to wedge into the teeth of both of said gear means.

8. In a gear train, the combination of, two spur gears spaced apart and mounted to turn on parallel axes, gear means adapted to mesh with said gears and provide a driving connection therebetween, means supporting said gear means for transaxial floating movement in all directions toward and away from said gears and in a plane perpendicular to said axes, and means yieldably urging said gear means toward both of said axes to hold the gear means in mesh with both of said gears.

HARRY A. SEVERSON,
*Executor of the Estate of Howard D. Colman, Deceased.*